Patented Feb. 7, 1939

2,146,234

UNITED STATES PATENT OFFICE 2,146,234

MOLDABLE RESIN

Fritz Seebach, Erkner, near Berlin, Germany, assignor to Bakelite Corporation, New York, N. Y., a corporation of Delaware No Drawing. Application June 12, 1936, Serial No. 84,874. In Germany June 15, 1935

10 Claims. (Cl. 260—59)

The present invention relates to the preparation of moldable resins from hardenable phenol aldehyde resins and particularly hardenable phenol formaldehyde resins that are in the resitole condition (B stage).

The present invention has for an object moldable resins in the resitole condition characterized by a property of flow such that they are well suited for the preparation of molded articles without the inclusion of any fillers. It is known that hardenable phenol formaldehyde resins in the resitole state are not fusible but they are plastic when heated so they can be shaped, for example, by the simultaneous application of heat and pressure. It has, however, been difficult to obtain molded articles with satisfactory properties from resitoles by following the customary procedure, since either the ability of the resitole to flow is insufficient or the physical characteristics of the molded articles are not satisfactory.

The present invention has for its basis the discovery that moldable resins can be prepared from resitoles of known types which yield molded articles of excellent character when the procedure for example is as follows:

Resitoles which are prepared, for example, by heating layers of resin of any desired degree of thickness in an oven, are disintegrated by breaking, grinding or crushing into granules of a size, say 2 to 3 mm. The resitole granules are mixed with water or aqueous suspensions in a mixer of a type commonly employed in the synthetic resin industry. The water or its equivalent can be added to the disintegrated resitole in an amount to form from 10 to 50% of the mixture; and the moistened material preferably after standing is treated on mixing rolls which are heated to about 80 to 100° C. The process can, however be carried out on a mixer without the application of external heat as for example on non-heated rolls. By the rolling operation the water-containing resitole becomes plastic and a sheet is formed similar to that obtained in the rolling of fusible phenol-aldehyde resins together with fillers. Water or aqueous suspensions can be applied once or repeatedly during the formation of the sheet, as for example by spraying, and thereby the "ripening" or maturing of the sheet can be extended over a prolonged period. The removal of the material from the mixing rolls follows when the sheet begins to loosen from the rolls or even at an earlier stage. In this manner there can be obtained a resin which is moldable per se and has any desired degree of flow. Sheets are obtained in this manner for example of a thickness varying from 5 to 10 mm. After removal from the rolls the sheets are comminuted and the products can be molded by following the known procedure of utilizing the simultaneous application of heat and pressure. Without the treatment as herein described resitoles as a rule are characterized by insufficient flow and at least yield molded pieces that are brittle with poor mechanical properties.

Resitoles prepared in accordance with the foregoing treatment can be moistened prior to molding by small quantities of water say from 1 to 5% to further increase their flowing property. At first the moistened mass feels wet but after some time, say after 12 to 24 hours, the water is absorbed in the resin so that it again feels dry.

Resitoles serving as starting materials for the present invention can be prepared for example by heating a hardenable resin made from phenol and formaldehyde or by mixing a novolak and hexamethylenetetramine in proportions to form a heat-hardening resin and heating in pans for example at 60 to 70° C. until the resin is reacted to the resitole condition. The amount of water added to the crushed resitole can be increased or diminished; the lower limit, however, is fixed by the necessity of having sufficient water present in the resin after taking into consideration the loss by evaporation occurring during the treatment on the mixing rolls. On the other hand no more water is to be added than can be taken up by the resin. The addition of water can be made directly prior to the rolling operation or at some earlier stage, as for example a few hours or one to 2 days before, but if found desirable the water can be added during the rolling operation. The rolling is continued until the resin when stripped from the rolls has the desired degree of flow. The length of time and other working conditions for blending the material is determined empirically by one or two preliminary tests. Upon completion of the rolling operation there remains as a rule about 2 to 5% of water. If the rolling operation is continued for too long a period the resin may lose its desirable properties; in such an event it is recommended that the treatment on the mixing rolls be repeated with another addition of water. In other cases as well the treatment on the mixing rolls can be repeated one or more times. During the treatment on the rolls material differing in color from the resitole can be introduced to give a striated effect; or other suitable materials can be included such as dyes, plasticizers, other resins hardenable or nonhardenable, fusible natural or synthetic resins, oxidized castor oil, etc. or stearic acid or other lubricating agents such as sperm oil. In place of water there can be used aqueous solutions or suspensions provided the dissolved or suspended material, such as a dye stuff or a resin, can remain in the resitole without detriment to its use. In place of water or any admixture with it there can be used other liquids which have little or no solvent action and no chemical action on the resin; for example suspensions of 5% cyclohexanol and 95% water or 5% toluol and 95% water can be used. Molded pieces can be fabricated in the usual manner by molding preferably in molds of the hot pressure type or for example by injection molding.

Example 1.—1 kilo liquid phenol, 0.8 kilo of formaldehyde (40% aqueous solution) and 2 grams of anhydrous potassium carbonate are reacted, and after resin separation the mass is subjected to evaporation and further heating until a resitole is formed, or the mass is discharged into a pan and heated say in an electrically-heated oven to about 70° C. to yield a resitole. The above described process is applied to a resitole of this character by breaking up the resitole, moistening it with say 40% of water and obtaining a sheet in accordance with the foregoing disclosure. When a water-containing resitole is being operated upon, it is first broken into pieces by a crushing machine and then brought to the mixing rolls to be further handled as described above.

Example 2.—1 kilogram of a novolak prepared from phenol or cresol and 100–150 grams of hexamethylenetetramine are melted or stirred together and converted to the resitole condition in an oven. Further operations follow as described in the foregoing.

In place of resitoles which are prepared from phenols and aldehydes as formaldehyde, there can also be utilized the products resulting from the heating of homogeneous compositions of resoles and fatty oils. Such compositions are obtained for instance by heating a resole with a fatty oil in the presence of a suitable solvent such as cyclohexanol, and after the formation of the homogeneous compositions, the solvent is distilled off and then the conversion of the composition to the resitole condition is obtained by heating.

The molding of the resitole follows the known procedure preferably by hot-press molding under substantially the same conditions existing in the molding of phenol-aldehyde resin molding mixtures.

The herein described procedure causes a noticeable and remarkable change in the colloidal structure of the resin in that a brittle and difficultly workable material is converted into a product of considerably increased elasticity and with good flow. This result is surprising for it is not to be expected that treatment with an indifferent liquid and heating can cause such a radical change. The result indicates a substantial improvement for in this simple manner a resitole is converted into a material which yields transparent articles of any shape, pleasing appearance and worthwhile properties.

As resitoles there can also be employed such as are obtained in accordance with the German Patent No. 587,576.

In place of mixing rolls, it is found for instance that a mixer or a kneader can be used; heat is preferably used in conjunction for this purpose, and applied at temperatures below which material advancement of the resin is caused.

What is claimed is:

1. Process of preparing a resin moldable without added filler from a heat-hardenable phenol-aldehyde resin in the resitole condition which comprises comminuting the resitole, and subjecting the comminuted resitole in the presence of water to the action of rolls heated to a temperature of not more than 100° C. until a plastic sheet is produced, the amount of water present being not more than can be taken up by the resin but enough to take care of evaporation during the rolling.

2. Process of preparing a resin moldable without added filler from a heat-hardenable phenol-aldehyde resin in the resitole condition which comprises comminuting the resitole, and subjecting the comminuted resitole in the presence of water to the action of rolls heated to a temperature of not more than 100° C. until the resin when stripped from the rolls is in plastic sheet form and has the desired degree of flow.

3. Process of preparing a resin moldable without added filler from a heat-hardenable phenol-aldehyde resin in the resitole condition which comprises comminuting the resitole, adding not less than about 40% of water based on the weight of resitole present, and subjecting the comminuted resitole to the action of rolls heated to a temperature of not more than 100° C. until the resin begins to loosen from the rolls.

4. Process of preparing a resin moldable without added filler which comprises preparing a heat-hardening resin of the phenol-aldehyde type, causing the formation of the resitole condition in the resin, comminuting the resitole, adding to the comminuted resitole from about 10 to 50 per cent of water based on the weight of resitole, and subjecting the resulting mixture to the action of rolls at a temperature of not more than about 100° C. until a plastic sheet is produced.

5. Process of preparing a resin moldable without added filler which comprises preparing a heat-hardening resin of the phenol-aldehyde type in the resitole condition, comminuting the resitole, adding to the comminuted resitole from about 10 to 50 per cent of water based on the weight of resitole, and subjecting the resulting mixture to the action of rolls at a temperature of not more than about 100° C. until a plastic sheet is produced.

6. Process of prpearing a resin moldable without added filler from a heat-hardenable resin in the resitole condition which comprises comminuting the resitole, adding to the comminuted resitole from about 10 to 50 per cent of water based on the weight of resitole, and subjecting the resulting mixture to the action of a mixer until a plastic sheet is produced.

7. Process of preparing a resin moldable without added filler from a heat-hardenable resin in a comminuted resitole condition which comprises adding to the resitole water, and subjecting the mixture to the action of a mixer until a plastic sheet is produced.

8. Process of preparing a resin moldable without added filler from a heat-hardenable resin in a comminuted resitole condition which comprises adding to the resitole water, and subjecting the mixture to the action of rolls until a plastic sheet is produced.

9. A resin of the phenol-aldehyde type moldable without added filler such as is obtained by the process of claim 7.

10. A resin of the phenol-aldehyde type moldable without added filler such as is obtained by the process of claim 8.

FRITZ SEEBACH.